UNITED STATES PATENT OFFICE.

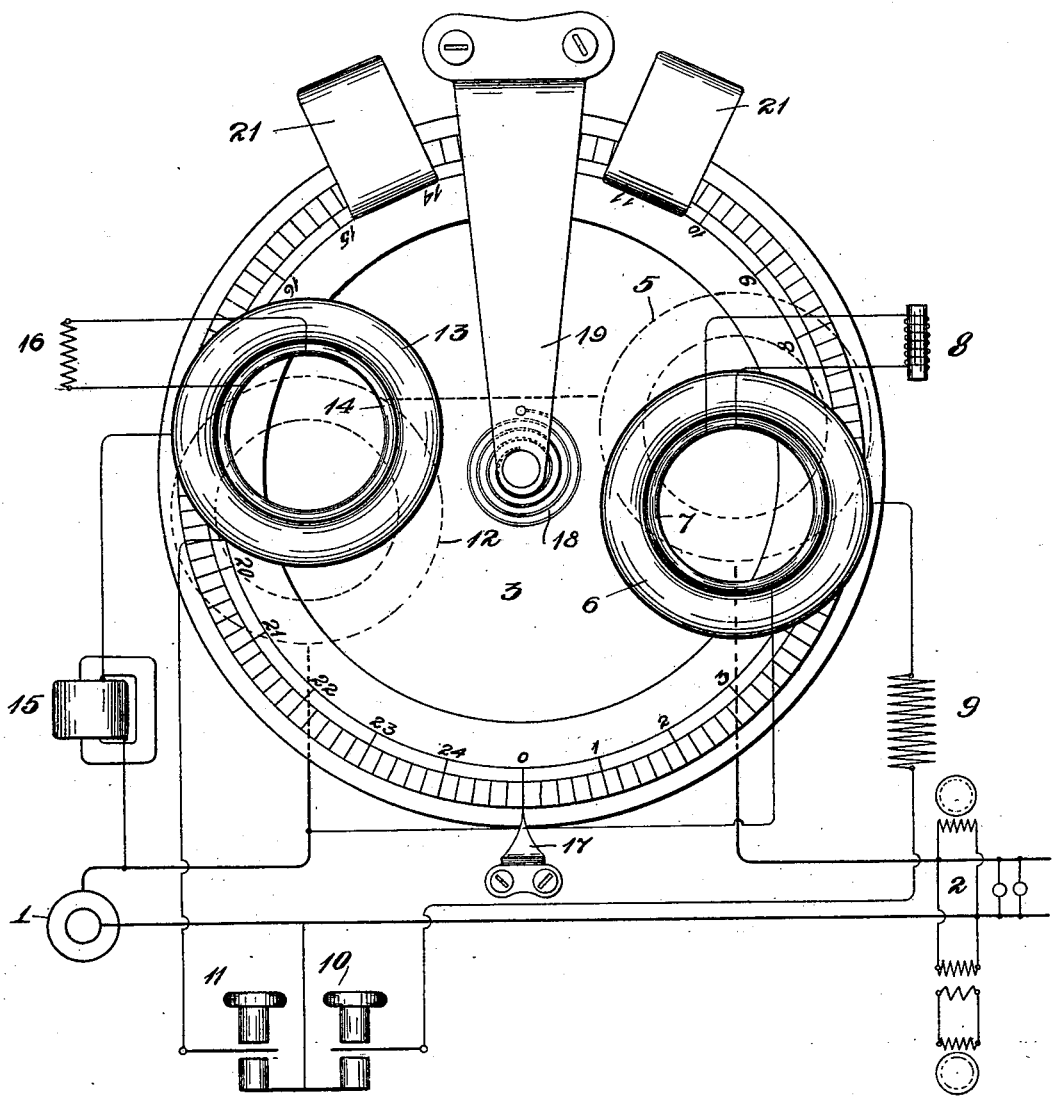

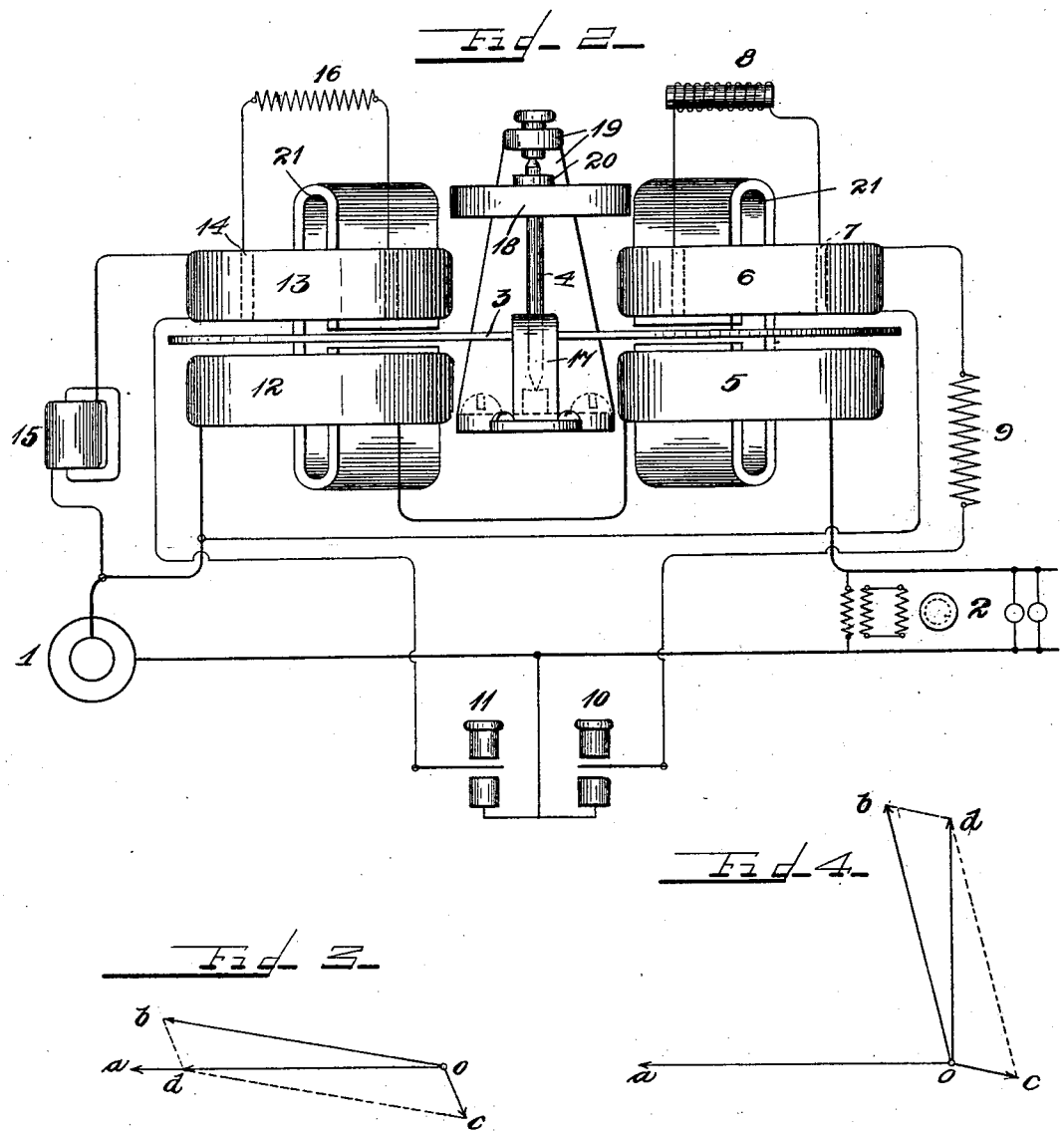

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ALTERNATING-CURRENT METER.

SPECIFICATION forming part of Letters Patent No. 698,670, dated April 29, 1902.

Application filed November 18, 1899. Renewed December 16, 1901. Serial No. 86,057. (No model.)

*To all whom it may concern:*

Be it known that I, THOMAS DUNCAN, a citizen of the United States, residing at Chicago, in the county of Cook and State of Illinois, have invented a certain new and useful Improvement in Alternating - Current Meters, (Case No. 309,) of which the following is a full, clear, concise, and exact description, reference being had to the accompanying drawings, forming a part of this specification.

My invention relates to alternating-electric-current meters, and has for its object the construction of a meter that will accurately measure in alternating-current power-circuits the "real" watts and the wattless or magnetizing component of the current. I am enabled by means of my invention to employ a single indicator or other measuring device that is capable of effecting the measurement of each of these load conditions. Heretofore it was necessary to determine the wattless or magnetizing component mathematically.

Generally speaking, my invention comprises a measuring element, suitable motor coils or windings for effecting the actuation thereof, and means for controlling the coöperative relation between the windings and the measuring element to secure the desired measurements. In practicing my invention I employ two sets of motor-windings, one of which is capable of actuating the measuring element to determine the "true" watts, while the other is capable of actuating the measuring element to determine the wattless or magnetizing component.

In applications Serial Nos. 730,847, 730,848, and 730,849, filed September 18, 1899, and No. 733,290, filed October 11, 1899, I have shown and described means for and a method of measuring the magnetizing or so-called "wattless" components in alternating - current power-circuits by means of induction motor-meters, while in applications Serial Nos. 735,807 and 735,808, filed November 4, 1899, I have shown how the same result might be accomplished by means of a meter carrying field-windings upon the armature.

In practicing my invention I employ means capable of causing either of the said motor elements to act alone upon the measuring element to effect the measurement of the true watts or of the wattless component. I may employ an induction motor-meter to effect this result; but I do not wish to be limited to the precise form of meter employed.

I will more fully describe my invention by reference to the accompanying drawings, showing one of many embodiments thereof, in which—

Figure 1 shows an induction type of indicating motor-meter constructed and arranged in accordance with the invention. Fig. 2 is a front elevation of the meter shown in Fig. 1. Figs. 3 and 4 are vector diagrams showing the phase relations of the magnetism due to the pressure-windings with the pressure.

Like parts are indicated by similar characters of reference in the different figures.

An alternating-current generator 1 is shown as supplying current to the translating devices 2. A disk armature 3, preferably made of aluminium, is suitably mounted upon the rotating spindle 4. At one side of the disk is secured a series field-coil 5, shown underneath the disk, which coil is connected in series with a main and is traversed by the current supplied to the translating devices. This current sets up a magnetic field in said coil 5 that is proportional to the current strength. Two coils 6 and 7 are shown above the disk 3 and eccentric with respect to coil 5, the coil 7 being in series with an impedance-coil 8, while the coil 6 is in series with a non-inductive resistance 9. The coils described are jointly capable of exerting a torque upon the armature 3 which is proportional to the current times the electromotive force times the sine of the angle of lag.

A key or switch 10 serves to include the coil 6, with its resistance 9, in bridge between the main conductors. The arrangement of the coils 6 and 7 is such that when the key 10 is depressed they may jointly produce a magnetic field that is in phase with the electromotive force between the main leads. There will then be no shifting field between the series coil 5 and the compound coil 6 7 when the translating devices are non-inductive or when the current in the leads is in phase with its electromotive force; but as the current lags in the work-circuit. the torque will increase proportionately until a lag of ninety degrees is reached, when the torque will reach its maximum. This will be understood by reference to Fig. 3, where $o\,a$ may represent the impressed electromotive force; $o\,b$, the current and magnetism of the coil 6; $o\,c$, the current and magnetism of the coil 7, and $o\,d$ the resultant magnetism of the coils 6 and 7, which resultant magnetism is in phase with the impressed electromotive force.

Other means than those shown may be devised for bringing the resultant magnetism due to the coils 6 and 7 in phase with the impressed electromotive force. The non-inductive resistance 9 is employed for the purpose of keeping the phase of the current $o\,b$ as nearly as possible in phase with the electromotive force $o\,a$. The inductance 8 is employed to cause the current through the coil 7 to lag as much as possible beyond one hundred and eighty degrees behind the electromotive force $o\,a$.

The portion of the instrument that I have thus far described is capable of measuring the wattless component in alternating-current circuits when the key 10 is depressed. If it should be desired to measure the true watts in an alternating-current circuit, the key 10 is released and the key 11 is depressed to operatively associate another set of motor-coils corresponding to the key with the armature 3, this set of coils then acting upon the said armature alone to exert thereon a torque which is proportional to the current times the electromotive force times the cosine of the angle of lag. Any well-known motor element may be employed for exerting this torque upon the armature to produce movement that will measure the true watts in the circuit.

I will describe the precise windings shown in the drawings. Diametrically opposite the coils 5, 6, and 7 or at any other suitable place is situated the coil 12, connected in this instance in series with the coil 5, the coil 12 being also beneath the disk. Above the disk and eccentric with respect to the coil 12 are placed the coils 13 and 14. The resultant magnetism, due to the current in the coils 13 and 14, is maintained in quadrature with the impressed electromotive force, the phase relations being indicated in Fig. 4, where $o\,a$ represent the impressed electromotive force or pressure, $o\,b$ the current and magnetism of the coil 13, $o\,c$ the current and magnetism of the coil 14, and $o\,d$ the resultant magnetism due to the currents in the coils 13 and 14, the resultant magnetism being in quadrature with the impressed electromotive force. The current in the coil 13 is lagged behind the electromotive force by including in its circuit the inductance 15, and the magnitude of the current in the coil 14 is regulated by the adjusting resistance 16. The switches 10 and 11 are preferably so constructed that they normally maintain the pressure-coils out of circuit with the main conductors, so that there is normally no torque exerted upon the armature. The operation of the apparatus will now be readily understood.

If it should be desired to measure the wattless component of alternating current in a system of distribution, key 10 is actuated to close circuit through the coil 6, the resultant field due to the coils 6 and 7 coöperating with the field due to the series winding 5 to produce a torque upon the armature that varies as the sine of the angle of lag between the current and pressure with a given amperage and voltage. If it should be desired to measure the true watts of alternating current in a system of distribution, key 11 is alone depressed to include the coil 13 in bridge of the supply-mains. The current in the coils 12, 13, and 14 causes a torque that varies as the cosine of the angle of lag between the current and electromotive force with a given amperage and voltage.

I have shown an armature as being provided with a scale marked off upon its periphery, a stationary pointer 17 being employed to indicate the extent of movement of the armature. A spiral spring 18 is fastened at one end to an arm 19, while the other end is fastened to the hub 20 of the armature to cause the instrument to act as an indicating device. To cause the armature to be dead-beat, permanent magnets 21 21 are employed. While I have shown keys for controlling the connections of pressure-coils of the two sets of motor-windings, I do not wish to be limited to the precise switching apparatus disclosed.

Modifications may readily be made in the apparatus of my invention without departing from its spirit, and I do not, therefore, wish to limit myself to the precise embodiment shown; but,

Having thus described my invention, I claim as new and desire to secure by Letters Patent—

1. In an alternating-current meter, the combination with a measuring element, of electromagnetic torque-producing motor means adapted in coöperation with said measuring element, to measure the "true" watts in an alternating-current circuit, a second electromagnetic torque-producing means adapted, in coöperation with said measuring element, to measure the wattless component in an alternating-current circuit, and means for bringing a torque-producing means into and out of operative association with the measuring element, substantially as described.

2. In an alternating-current meter, the combination with a measuring element, of electromagnetic torque-producing motor means adapted in coöperation with said measuring element, to measure the "true" watts in an alternating-current circuit, a second electromagnetic torque-producing means adapted, in coöperation with said measuring element, to measure the wattless component in an alternating-current circuit, and means for bringing each torque-producing means into and out of operative association with the measuring element, substantially as described.

3. In a system of alternating-current distribution, the combination with an alternating-current generator, of a movable element and electromagnetic means receiving current from said generator for exerting two torques upon the movable element, one capable of causing movement of said element proportional to the "true" watts, and the other, movement of said element proportional to the magnetizing component of the alternating current, and means whereby said element may be subjected to either one only of said torques, substantially as described.

4. In a system of alternating-current distribution, the combination with an alternating-current generator, of a movable element, electromagnetic means receiving current from said generator for exerting two torques upon said element respectively proportional to the "true" watts and the magnetizing component, and means whereby said element may be subjected to one only of said torques, substantially as described.

5. In a system of alternating-current distribution, the combination with an alternating-current generator, of a movable element, electromagnetic means receiving current from said generator for exerting two torques upon said element respectively proportional to the "true" watts and the magnetizing component, and means whereby said element may be subjected to either of said torques, substantially as described.

6. In an alternating-current meter, the combination with means for producing two pressure-fields substantially in quadrature with each other, of means for producing a third field by, and varying in phase with, the current, and a movable measuring element, the latter field in coöperation with one of the pressure-fields serving to actuate said measuring element to determine the "true" watts and in coöperation with the other field to move said element to determine the magnetizing component, and means whereby said element may be subjected to the action of either one only of said torques, substantially as described.

7. In an alternating-current meter, the combination with means for producing two pressure-fields substantially in quadrature with each other, of means for producing a third field by, and varying in phase with the current, a movable measuring element, and means whereby said measuring element may be subjected to the action of the current-field and one pressure-field only, substantially as described.

8. In an alternating-current meter, the combination with a measuring element, of pressure and current field-windings for producing torques upon the measuring element proportional to the "true" watts and to the magnetizing component, and means for limiting the measuring element to the action of one of the torques, substantially as described.

9. In an alternating-current meter, the combination with a measuring element, of pressure and current field-windings for producing torques upon the measuring element proportional to the "true" watts and to the magnetizing component, and means for permitting said element to be subject to either torque alone, substantially as described.

10. In an alternating-current meter, the combination with a measuring element, of pressure and current field-windings for producing torques upon the measuring element proportional to the "true" watts and to the magnetizing component, and switching means adapted to control the continuity of circuit connections for limiting the measuring element to the action of one of the torques, substantially as described.

11. In an alternating-current meter, the combination with a measuring element, of two sets of windings each comprising a current and pressure winding for producing torques upon the measuring element proportional to the "true" watts and to the magnetizing component, and switching means adapted to control the continuity of circuit connections for limiting the measuring element to the action of one of the torques, substantially as described.

12. In an alternating-current meter, the combination with a measuring element, of means for producing torques proportional to the true watts and to the magnetizing component, and means for limiting the measuring element to the action of one of said torques, substantially as described.

In witness whereof I hereunto subscribe my name this 14th day of November, A. D. 1899.

THOMAS DUNCAN.

Witnesses:
JAMES DALTON,
WM. F. MEYER.